US006488858B2

(12) United States Patent
Tanimura et al.

(10) Patent No.: US 6,488,858 B2
(45) Date of Patent: Dec. 3, 2002

(54) METHOD OF CONTROLLING CHROMATOGRAPHIC SEPARATION PROCESS

(75) Inventors: Masatake Tanimura, Tokyo (JP); Toshihiro Iwamoto, Tokyo (JP)

(73) Assignee: Nippon Rensui Co., Tokyo (JP)

( * ) Notice: Subject to any disclaimer, the term of this patent is extended or adjusted under 35 U.S.C. 154(b) by 50 days.

(21) Appl. No.: 09/801,743

(22) Filed: Mar. 9, 2001

(65) Prior Publication Data

US 2001/0030158 A1 Oct. 18, 2001

(30) Foreign Application Priority Data

Mar. 10, 2000 (JP) .......................................... 2000-065973

(51) Int. Cl.[7] ............................................... B01D 15/08
(52) U.S. Cl. ..................... 210/659; 210/198.2; 127/46.2
(58) Field of Search ................................. 210/656, 659, 210/198.2; 127/46.1, 46.2, 46.3

(56) References Cited

U.S. PATENT DOCUMENTS

| 4,599,115 A | * | 7/1986 | Ando | 210/656 |
| 4,970,002 A | * | 11/1990 | Ando | 210/659 |
| 5,064,539 A | * | 11/1991 | Tanimura | 210/659 |
| 5,556,546 A | * | 9/1996 | Tanimura | 210/659 |
| 6,063,285 A | * | 5/2000 | Hotier | 210/659 |
| 6,096,218 A | * | 8/2000 | Hauck | 210/659 |
| 6,280,623 B1 | * | 8/2001 | Ma | 210/264 |

FOREIGN PATENT DOCUMENTS

| JP | 6-170112 | 6/1994 | ................. 210/659 |

* cited by examiner

*Primary Examiner*—Ernest G. Therkorn
(74) *Attorney, Agent, or Firm*—Sughrue Mion, PLLC

(57) ABSTRACT

A chromatographic process of a type wherein a feedstock fluid containing a plurality of components is supplied into a circulative chromatographic separation system, the process comprising the steps of (i) supplying the feedstock fluid and withdrawing a fraction enriched in a component, (ii) supplying a desorbent fluid and withdrawing a fraction enriched in another component, and (iii) circulating the fluid through the bed without supplying or withdrawing any fluid thereby making a mixed zone comprising a plurality of components move, a cycle including steps (i), (ii) and (iii) being repeated while controlling the discharged pressure of a pump delivering the feedstock fluid, the desorbent fluid, and the circulating fluid constant.

12 Claims, 3 Drawing Sheets

METHOD OF CONTROLLING CHROMATOGRAPHIC SEPARATION PROCESS

BACKGROUND OF THE INVENTION

1. Field of the Invention

This invention relates to a process of chromatographic separation and more particularly to a method of controlling chromatographic separation of a fluid mixture comprising two or more components into two or more fractions enriched in the respective components.

2. Description of Related Art

Chromatographic separation by use of a solid adsorbent is extensively conducted in industries. Various techniques of chromatographic separation have been proposed for separating a mixture of two or more components into fractions enriched in each component.

Among chromatographic separation systems a simulated moving-bed system is widely used in industries for its excellent separation performance and high productivity. In this system a feedstock fluid or a desorbent is supplied to a packed bed at a prescribed constant flow rate, and the fluid flows through the packed bed also at a prescribed constant flow rate (hereinafter referred to as a constant flow rate control system) The simulated moving-bed system, however, requires a complicated apparatus and high skill of control on the supply of a feedstock fluid or a desorbent to the packed bed and on the movement of the fluid circulating through the packed bed.

Chromatographic separation processes which can achieve satisfactory separation results with simpler apparatus have been proposed as disclosed in JP-A-63-158105 (corresponding to U.S. Pat. No. 4,970,002 and Canadian Patent No. 1305434) and JP-A-2-49159. The process disclosed in JP-A-63-158105, for example, comprises repetition of cycles each including at least three steps; a step of supplying a feedstock fluid, a step of supplying a desorbent fluid, and a step of circulating the fluid through the packed bed.

In the simulated moving-bed system, the concentration distribution curves made in the packed bed macroscopically have almost the same form and circulatively move through the packed bed with time while keeping the form. Accordingly, the pressure required for moving the fluid through the packed bed, namely, the pressure drop (pressure loss) produced when the liquid moves through the packed bed may be seen substantially equal in any time zone. In this situation, the above-described constant flow rate control system is an effective system for controlling the apparatus with good reproducibility to obtain desired separation performance.

According to the method of JP-A-63-158105, the flow rate of the feedstock liquid and the desorbent fluid while being supplied and the flow rate of the liquid moving through the packed bed are controlled at a prescribed rate, and switches among the steps are made for a certain lapse of time. In this case, however, the concentrations of the individual components in the packed bed and the concentration distributions formed in the bed gradually vary with time in every step. More specifically, in the step wherein the feedstock fluid is supplied while a fraction enriched in a certain component is withdrawn, the concentration of the components present in the packed bed gradually increases from start to finish of the supply. In the step wherein the desorbent is supplied while a fraction enriched in another certain component is withdrawn, the concentration of the component present in the packed bed gradually decreases from start to finish of the supply. Even in the step of circulating the fluid in the packed bed without supplying or withdrawing any liquid thereby to allow an adsorption zone containing a plurality of components to move to the upstream end of the packed bed, the concentration distribution in the packed bed gradually changes from start to finish of the step.

A mixture of saccharides (i.e., a carbohydrate solution including various kinds of sugars and/or sugar alcohols) is one of the most common feedstock fluid to be treated by chromatographic separation. In the present invention, the mixture of saccharides means a mixture solution of at least two selected from the group consisting of sugars and sugar alcohols. A mixture of saccharides greatly varies its viscosity depending on the concentration, and a high concentration mixture has a high viscosity. In treating such a fluid as greatly varies its viscosity according to the concentration, such as a saccharides mixture, variations in concentrations or concentration distributions of the components present in the packed bed necessitate variations of the pressure for moving the fluid through the bed. In other words, the pressure drop generated in moving the fluid through the packed bed gradually changes.

The changes in pressure drop are analyzed as follows. In the supply step in which a feedstock fluid containing a plurality of components is fed, a fluid having a lower concentration than the feedstock fluid and enriched in a certain component is withdrawn. Accordingly, the average concentration of the components in the bed gradually increases during this step. In the step of supplying the desorbent and withdrawing another fraction enriched in another component, the fluid withdrawn is obviously higher in concentration than the desorbent. This means that the average concentration of the components present in the packed bed is gradually decreasing in this desorption step.

Hence, the pressure necessary to allow the fluid to move through the packed bed generally reaches the maximum at about the end of the step of feeding the feedstock fluid and the minimum at about the end of the step of feeding the desorbent fluid.

In the chromatographic process described in JP-A-63-158105, a pump is used for supplying the feedstock liquid and the desorbent fluid and for circulatively moving the fluid through the packed bed. The operation is controlled by adjusting the flow rate of the pump so as to maintain the flow rate constant. The pump should be designed to have a discharged head to give at least the maximum pressure around the end of the feedstock supplying step. The discharged head required in the step of feeding the desorbent, on the other hand, does not need to be so high as in the end of the feedstock supplying step. While the desorbent is supplied, therefore, excess pressure is consumed by a control valve, etc. to keep the prescribed flow rate.

The column (container) containing the packed bed is also designed to have resistance to the maximum pressure imposed at about the end of the feedstock supplying step, but the same pressure resistance is not needed in the desorbent supplying step.

In this way, since the above-described chromatographic separation is carried out while maintaining the flow rate of the pump constant, it is necessary to set the discharged head of the pump and the pressure resistance of the packed bed column at or above the maximum pressure reached in the operation. These capacities are made full use of in the step of supplying the feedstock fluid but are excessive in other steps, which incurs fruitless increases in construction cost of the apparatus (plant) and operating cost.

SUMMARY OF THE INVENTION

An object of the present invention is to provide an improvement in process control in carrying out a chromatographic process for separating a mixture comprising a plurality of components into fractions enriched in the respective components, the process involving variations of concentration and concentration distribution of components in a packed bed as in JP-A-63-158105.

The concept of the present invention consists in controlling the movement of the feedstock fluid, the desorbent fluid and the fluid in the packed bed by maintaining the discharged pressure of the pump constant unlike the method in which the flow rate of the pump is adjusted to a prescribed value.

The present invention provides a chromatographic process of a type wherein a feedstock fluid containing a plurality of components having different degrees of affinity for an adsorbent is supplied into a chromatographic separation system, in which the downstream end of a bed packed with the adsorbent is connected to its upstream end by a piping (fluid channel) to enable the fluid to circulate through packed bed, and made to flow in the packed bed from the upstream end of the packed bed to its downstream end thereby to form adsorption zones having the concentration distribution of the respective components in the packed bed and then separated into two or more fractions enriched by the respective components, the process comprising the steps of:

(i) supplying the feedstock fluid into the packed bed at its upstream end while withdrawing a fraction enriched in a first component from the downstream end of the bed, (ii) supplying a desorbent fluid into the packed bed at its upstream end while withdrawing a fraction enriched in a second component from the downstream end of the bed, and (iii) circulating the fluid in the bed from the downstream end to the upstream end through the piping without supplying or withdrawing any fluid to or from the packed bed, thereby making a mixed zone comprising the first component withdrawn in step (i) and the second component move to the upstream end of the packed bed, a cycle including steps (i), (ii) and (iii) in any order being repeated while controlling the discharged pressure of a pump delivering the feedstock fluid, the desorbent fluid, and the circulating fluid to be constant.

BRIEF DESCRIPTION OF THE DRAWINGS

In FIGS. 2 and 3, the Y-axis and X-axis denote concentration of an individual component (%), and time (min.), respectively.

DETAILED DESCRIPTION OF THE INVENTION

A process of chromatographic separation as taught in JP-A-63-158105, in which a feedstock fluid is fed intermittently, and components of the feedstock fluid are always present in the packed bed, is carried out by repeating cycles each basically including the steps of:

(i) supplying the feedstock fluid into the packed bed at its upstream end while withdrawing a fraction enriched in a first component from the downstream end of the bed (hereinafter referred to as a supply step), (ii) supplying a desorbent fluid into the packed bed at its upstream end while withdrawing a fraction enriched in a second component from the downstream end of the bed (hereinafter referred to as a desorption step), and (iii) circulating the fluid in the bed without supplying or withdrawing any fluid to or from the packed bed, thereby making a mixed zone comprising the first component withdrawn in step (i) and the second component move to the upstream end of the packed bed (hereinafter referred to as a circulation step).

Figure 1:
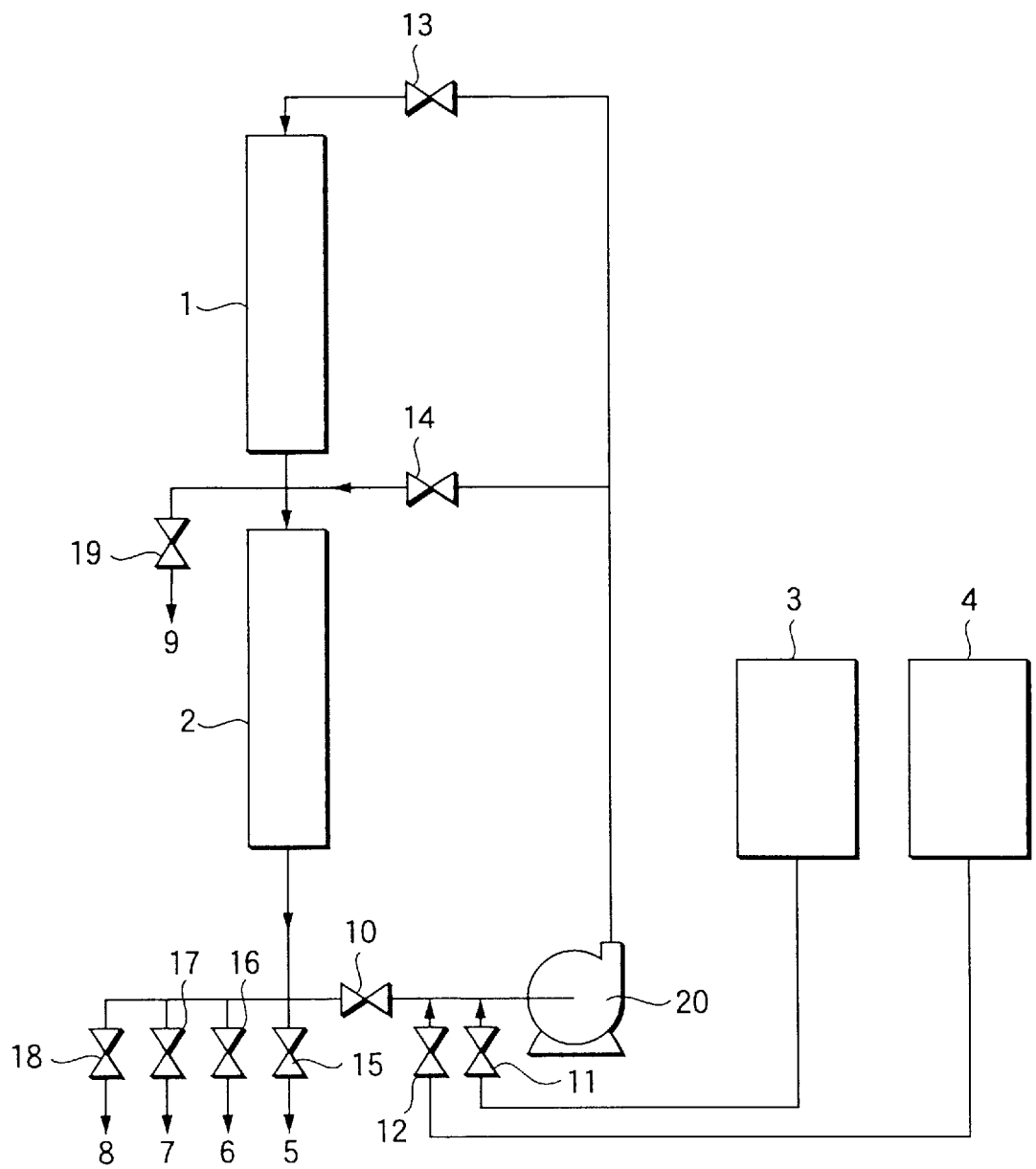
FIG. 1 is a schematic diagram of a chromatographic separation apparatus which can be used for carrying out the process of the invention.

The chromatographic separation process according to the present invention is carried out by repeating the cycle comprising at least steps (i) to (iii) and, if necessary, additional steps depending on the components contained in the feedstock fluid to be separated. An example of the chromatographic separation apparatus that can be used in carrying out the process of the invention is shown in FIG. 1. The apparatus shown comprises unit beds 1 and 2, which may be equal or different in capacity, packed with an adsorbent, a feedstock fluid tank 3, a desorbent fluid tank 4, and a pump 20 for feeding the feedstock fluid and the desorbent fluid and for circulating the fluid in the packed bed (1 and 2). Lines 5 to 9 are for withdrawal of fractions, and ON-OFF valves 10 to 19 are provided for each line.

In chromatographic separation with the apparatus of FIG. 1, the concentration and the concentration distribution of each component in the packed bed change with time. That is, the average concentration of the components in the bed gradually increases during the supply step from beginning to end of the feedstock fluid supply, reaching the maximum at the end. In the desorption step the average concentration of the components in the bed gradually decreases from beginning to end of the desorbent supply, reaching the minimum at the end. In the circulation step, the average concentration as a whole does not change, but the components are separated from each other as they move during the time from commencement to completion of the circulation, resulting in gradual changes of their concentration distribution. Including the supply step and the desorption step, the above-described chromatographic separation process develops a state in which the components of the feedstock fluid exist in a higher concentration and a state in which they exist in a lower concentration.

However, in cases where the feedstock fluid varies greatly in viscosity depending on its concentration like a mixture of saccharides, the fact that the concentration or the concentration distribution of the components present in the packed bed varies means that the pressure required for making the fluid move through the packed bed at a constant flow rate, namely, the pressure drop through the bed varies with time. If the fluid is made to move at the end of the supply step, at which the components of the saccharide mixture exist in the highest concentration, at the same flow rate as before, a higher pressure drop results.

Entering into the details of the changes in pressure drop, the average concentration of the components present in the packed bed gradually increases in the supply step, where a liquid having a lower concentration than the feedstock fluid and enriched in a certain component is withdrawn, and reaches the maximum at the end of the supply step. Where the supply step is followed by the desorption step, the average concentration of the components of the fluid present in the packed bed gradually decreases as a fluid having a higher concentration than the desorbent fluid is withdrawn. This means that the pressure for making the fluid in the packed bed move at a constant flow rate reaches the maximum at around the end of the supply step and begins to decrease on the commencement of the desorption step, reaching the minimum at around the end of the desorption step.

In carrying out chromatographic separation by use of the apparatus shown in FIG. 1, it has been the practice conventionally followed to set flow rate of the pump, namely, the flow rate at a prescribed value (constant flow rate control). That is, the pump is designed to have a discharged head to give at least the maximum pressure reached around the end of the supply step. However, the discharged head of the pump required in the desorption step does not need to be so high as in the end of the supply step. In the desorption step, therefore, the pressure of the pump is excessive. As a result, excess of the discharged head of the pump should be consumed by control valves, etc. in time zones other than around the end of the supply step so that the sum of the consumed pressure and the pressure required for the fluid's movement may be equal to the discharged head of the pump.

In the present invention, the excess of the discharged head of the pump, which is appeared in time zones other than around the end of the supply step, can be made effective use of over all the time zones involved in the process by keeping the pump delivery pressure constant (constant pressure control) instead of the constant flow rate control. Under this constant pressure control, the pump can always be operated to its utmost in power, which is very efficient. In time zones other around the end of the supply step, the fluid can be made to flow at a higher flow rate as could be in the conventional constant flow rate control system.

The time required for completing one cycle, i.e., from the start of a supply step to the start of a next supply step is shorter in the constant pressure control system than in the conventional constant flow rate control system. The amount of the feedstock fluid treated per cycle being fixed, the shorter cycle time in the constant pressure control system means an increased throughput of the apparatus per unit time.

The operation efficiency can further be increased by such a manipulation that a switch from one step to another per cycle is made not by time but by the amount of liquid discharged from the pump. That is, the switch is made when the cumulative amount of the liquid discharged from the pump reaches a prescribed value.

Since the column of the packed bed is designed according to the discharged head of the pump, the pump can always be operated to the utmost in discharged head without causing any damage to the column.

When the process of the invention is applied to an existing chromatographic separation apparatus, the time required for making a cycle is shortened, and the productivity can thus be improved. When a new chromatographic separation apparatus is set up, it can be made smaller-sized and less expensive.

The process of the invention can be applied to various mixtures which comprise a plurality of components and separable into components by chromatographic technique. Typical applicable mixtures include mixtures of various saccharides (e.g., sugars and/or sugar alcohols). For example, the process is applicable to separation of fructose from high fructose corn syrup, separation of oligosaccharides from high fructose corn syrup, separation of sucrose from molasses, separation of a starch hydrolyzate containing maltose, maltodextrin, etc. into the individual components, separation of an inuline hydrolyzate containing fructose, inulo-biose, etc. into the individual components, separation of a mixture containing isomaltose and isomaltose dextrin into the individual components, and separation of a mixture containing sugar alcohols, such as sorbitol and maltitol, into the individual components.

The adsorbents which can be used as a packed bed typically include ion exchange resins, such as strong acidic cation exchange resins of alkali metal (e.g., Na or K) salt form or alkaline earth metal (e.g., Ca) salt form.

The present invention is also applicable to a separation process comprising the basic steps (i) to (iii) described in JP-A-63-158105 and additional steps in conformity to the feedstock liquid to be treated and the separation conditions. Illustrative embodiments for carrying out the present invention include:

(1) A chromatographic process of a type wherein a feedstock fluid containing a plurality of components having different degrees of affinity for an adsorbent is supplied into a chromatographic separation system, in which the downstream end of a bed packed with the adsorbent is connected to its upstream end by a piping to enable the fluid to circulate, and made to flow in the packed bed from the upstream end to the downstream end thereby to form adsorption zones having the concentration distribution of the individual components and then separated into two or more fractions, the process comprising the steps of:

(i) supplying the feedstock fluid into the packed bed at its upstream end while withdrawing a fraction enriched in a component having a higher degree of affinity for the adsorbent from the downstream end of the bed, (ii) supplying a desorbent fluid into the packed bed at its upstream end while withdrawing a fraction enriched in a component having a lower degree of affinity for the adsorbent from the downstream end of the bed, and (iii) circulating the fluid in the bed without supplying or withdrawing any fluid to or from the packed bed, thereby making a mixed zone comprising the component having a higher degree of affinity for the adsorbent and the component having a lower degree of affinity for the adsorbent move to the upstream end of the packed bed, a cycle including steps (i), (ii) and (iii) being repeated to separate the feedstock fluid into two fractions.

(2) A chromatographic process of the type described in (1) above, which includes the steps of:

(i) supplying the feedstock fluid into the packed bed at its upstream end while withdrawing a fraction enriched in a component having a higher degree of affinity for the adsorbent from the downstream end of the bed, (ii) supplying a desorbent fluid into the packed bed at its upstream end while withdrawing a fraction enriched in the component having a higher degree of affinity for the adsorbent from the downstream end of the bed, (iii) supplying a desorbent fluid into the packed bed at its upstream end while withdrawing a fraction enriched in a component having a lower degree of affinity for the adsorbent from the downstream end of the bed, and (iv) circulating the fluid in the bed without supplying or withdrawing any fluid to or from the packed bed, thereby making a mixed zone comprising the component having a higher degree of affinity for the adsorbent and the component having a lower degree of affinity for the adsorbent move to the upstream end of the packed bed, a cycle including steps (i), (ii), (iii) and (iv) being repeated to separate the feedstock fluid into two fractions.

(3) A chromatographic process of the type described in the embodiment (1) above, which includes the steps of:

(i) supplying the feedstock fluid into the packed bed at its upstream end while withdrawing a fraction enriched in a component having a higher degree of affinity for the adsorbent from the downstream end of the bed, (ii) supplying a desorbent fluid into the packed bed at an intermediate part between the upstream end and the downstream end of the packed bed while withdrawing a fraction enriched in the component having a higher degree of affinity for the adsorbent from the downstream end of the bed, (iii) circulating the fluid in the bed without supplying or withdrawing any fluid to or from the packed bed, thereby making a mixed zone comprising the component having a higher degree of affinity for the adsorbent and a component having a lower degree of affinity for the adsorbent move to the upstream end of the packed bed, (iv) supplying a desorbent fluid into the packed bed at its upstream end while withdrawing a fraction enriched in the component having a lower degree of affinity for the adsorbent from the downstream end of the bed, and (v) circulating the fluid in the bed without supplying or withdrawing any fluid to or from the packed bed, thereby making a mixed zone comprising the component having a higher degree of affinity for the adsorbent and the component having a lower degree of affinity for the adsorbent move to the upstream end of the packed bed, a cycle including steps (i) to (v) being repeated to separate the feedstock fluid into two fractions.

(4) A chromatographic process of the type described in the embodiment (1) above, which includes the steps of:

(i) supplying the feedstock fluid into the packed bed at its upstream end while withdrawing a fraction enriched in a component having a lower degree of affinity for the adsorbent from the downstream end of the bed, (ii) circulating the fluid in the bed without supplying or withdrawing any fluid to or from the packed bed, thereby making a mixed zone comprising a component having a higher degree of affinity for the adsorbent and the component having a lower degree of affinity for the adsorbent move to the upstream end of the packed bed, and (iii) supplying a desorbent fluid into the packed bed at its upstream end while withdrawing a fraction enriched in the component having a higher degree of affinity for the adsorbent from the downstream end of the bed, a cycle including steps (i), (ii) and (iii) being repeated to separate the feedstock fluid into two fractions.

(5) A chromatographic process of the type described in the embodiment (1) above, which includes the steps of:

(i) supplying the feedstock fluid into the packed bed at its upstream end while withdrawing a fraction enriched in a component having the highest degree of affinity but one for the adsorbent from the downstream end of the bed, (ii) circulating the fluid in the bed without supplying or withdrawing any fluid to or from the packed bed, thereby making a mixed zone comprising the component having the highest degree of affinity but one for the adsorbent and a component having the highest degree of affinity for the adsorbent move to the upstream end of the packed bed, (iii) supplying a desorbent fluid into the packed bed at the upstream end of the packed bed while withdrawing a fraction enriched in the component having the highest degree of affinity for the adsorbent from the downstream end of the bed, (iv) supplying a desorbent fluid into the packed bed at the upstream end of the packed bed while withdrawing a fraction enriched in a component having the lowest degree of affinity for the adsorbent from the downstream end of the bed, and (v) circulating the fluid in the bed without supplying or withdrawing any fluid to or from the packed bed, thereby making a mixed zone comprising the component having the highest degree of affinity but one for the adsorbent and the component having the lowest degree of affinity for the adsorbent move to the upstream end of the packed bed, a cycle including steps (i) to (v) being repeated to separate the feedstock fluid into three fractions.

(6) A chromatographic process of the type described in the embodiment (1) above, which includes the steps of:

(i) supplying the feedstock fluid into the packed bed at its upstream end while withdrawing a fraction enriched in a component having the second highest degree of affinity for the adsorbent from the downstream end of the bed, (ii) supplying a desorbent fluid into the packed bed at an intermediate part between the upstream end and the downstream end of the packed bed while withdrawing a fraction enriched in the component having the second highest degree of affinity for the adsorbent from the downstream end of the bed, (iii) circulating the fluid in the bed without supplying or withdrawing any fluid to or from the packed bed, thereby making a mixed zone comprising the component having the second highest degree of affinity for the adsorbent and a component having the highest degree of affinity for the adsorbent move to the upstream end of the packed bed, (iv) supplying a desorbent fluid into the packed bed at the upstream end of the packed bed while withdrawing a fraction enriched in the component having the highest degree of affinity for the adsorbent from the downstream end of the bed, (v) supplying a desorbent fluid into the packed bed at the upstream end of the packed bed while withdrawing a fraction enriched in a component having the lowest degree of affinity for the adsorbent from the downstream end of the bed, and (vi) circulating the fluid in the bed without supplying or withdrawing any fluid to or from the packed bed, thereby making a mixed zone comprising the component having the second highest degree of affinity for the adsorbent and the component having the lowest degree of affinity for the adsorbent move to the upstream end of the packed bed, a cycle including steps (i) to (vi) being repeated to separate the feedstock fluid into three fractions.

(7) A chromatographic process of the type described in the embodiment (1) above, which includes the steps of:

(i) supplying the feedstock fluid into the packed bed at its upstream end while withdrawing a fraction enriched in a component having the second highest degree of affinity for the adsorbent from the downstream end of the bed, (ii) further supplying the feedstock fluid into the packed bed at its upstream end while withdrawing a fraction enriched in a component having the lowest degree of affinity for the adsorbent from an intermediate part between the upstream end and the downstream end of the bed, (iii) circulating the fluid in the bed without supplying or withdrawing any fluid to or from the packed bed, thereby making a mixed zone comprising the component having the second highest degree of affinity for the adsorbent and the component having the highest degree of affinity for the adsorbent move to the upstream end of the packed bed, (iv) supplying a desorbent fluid into the packed bed at the upstream end of the packed bed while withdrawing a fraction enriched in a component having the highest degree of affinity for the adsorbent from the downstream end of the bed, (v) supplying a desorbent fluid into the packed bed at the upstream end of the packed bed while withdrawing a fraction enriched in the component having the lowest degree of affinity for the adsorbent from the downstream end of the bed, and (vi) circulating the fluid in the bed without supplying or withdrawing any fluid to or from the packed bed, thereby making a mixed zone comprising the component having the second highest degree of affinity for the adsorbent and the component having the lowest degree of affinity for the adsorbent move to the upstream end of the packed bed, a cycle including steps (i) to (vi) being repeated to separate the feedstock fluid into three fractions.

(8) A chromatographic process of the type described in the embodiment (1) above, which includes the steps of:

(i) supplying the feedstock fluid into the packed bed at its upstream end while withdrawing a fraction enriched in a component having the second highest degree of affinity for the adsorbent from the downstream end of the bed, (ii) supplying a desorbent fluid into the packed bed at an intermediate part between the upstream end and the downstream end of the packed bed while withdrawing a fraction enriched in the component having the second highest degree of affinity for the adsorbent from the downstream end of the bed, (iii) circulating the fluid in the bed without supplying or withdrawing any fluid to or from the packed bed, thereby making a mixed zone comprising the component having the second highest degree of affinity for the adsorbent and a component having the highest degree of affinity for the adsorbent move to the upstream end of the packed bed, (iv) supplying a desorbent fluid into the packed bed at the upstream end of the packed bed while withdrawing a fraction enriched in the component having the highest degree of affinity for the adsorbent from the downstream end of the bed, (v) supplying a desorbent fluid into the packed bed at the upstream end of the packed bed while withdrawing a fraction enriched in a component having the lowest degree of affinity for the adsorbent from the downstream end of the bed, (vi) supplying a desorbent fluid into the packed bed at the upstream end of the packed bed while withdrawing a fraction enriched in a component having the third highest degree of affinity for the adsorbent from the downstream end of the bed, and (vii) circulating the fluid in the bed without supplying or withdrawing any fluid to or from the packed bed, thereby making a mixed zone comprising the component having the second highest degree of affinity for the adsorbent and the component having the third highest degree of affinity for the adsorbent move to the upstream end of the packed bed, a cycle including steps (i) to (vii) being repeated to separate the feedstock fluid into four fractions.

The present invention, of course, is applicable to chromatographic separation processes comprising cycles each comprising feeding a feedstock liquid in a limited time zone to withdraw a fraction enriched in a certain component, feeding a desorbent to withdraw a fraction enriched in a certain component without feeding the feedstock fluid in another time zone, and circulatively moving the fluid as taught, e.g., in JP-A-62-91205, JP-A-1-80409, JP-A-4-227804, JP-A-4-334503, JP-A-4-367701, JP-A-11-267404, JP-A-11-183459, and JP-A-4-363102.

The present invention will now be illustrated in greater detail with reference to Examples, but it should be understood that the invention is not construed as being limited thereto.

EXAMPLE 1

Using an apparatus of the type shown in FIG. 1, chromatographic separation of a feedstock fluid (a mixture of sugar alcohols), whose composition is shown in TABLE 1, was carried out with a strongly acidic cation exchange resin of Ca salt form (Diaion (TM) UBK-535, available from Mitsubishi Chemical Corp.) as an adsorbent and water as a desorbent. The packed bed of the apparatus was composed of two unit beds 1 and 2 connected in series, each unit bed including two columns connected in series. One column had an inner diameter of 102.3 mm and a packing height of 1,500 mm. The packed bed containing 49.3 liters, in total, of the adsorbent was kept at 80° C., and each fluid was passed therethrough under a pumping pressure of 0.5 MPa according to the schedule shown in Table 2.

Figure 2:
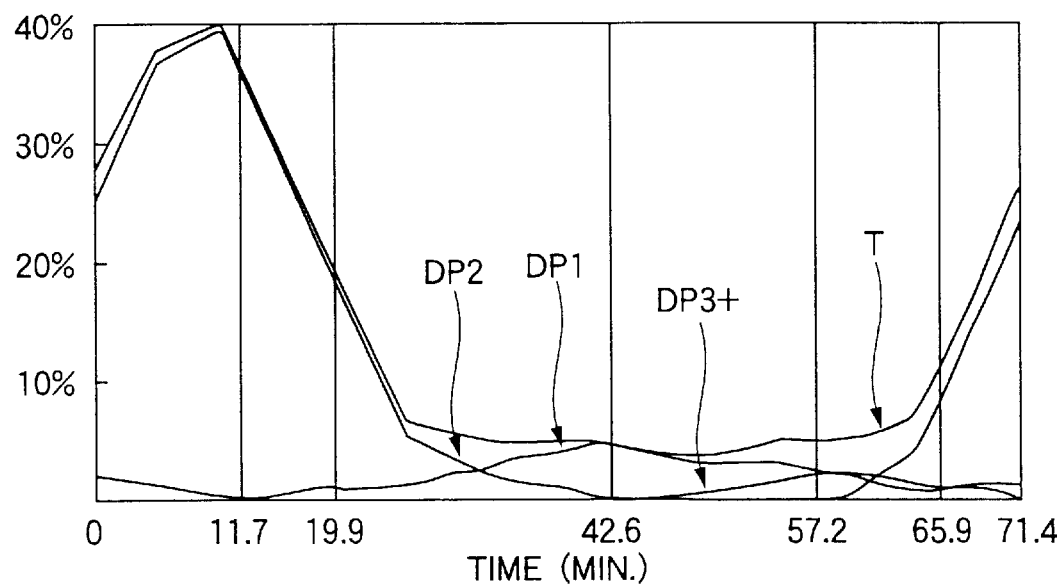
FIG. 2 shows concentration distributions of individual liquid components flown out from a packed bed in a working example.

Upon completion of 11 cycles, a steady state was reached, and the elution curves shown in FIG. 2 were obtained. In FIG. 2, the Y-axis and X-axis denote concentration of an individual component (%), and time (min.), respectively. Curves DP1, DP2 and DP3+ depict the concentration distribution curves of sorbitol, maltitol, and sugar-alcohols of tri- or higher polysaccharides, respectively. Curve T represents the total sugar concentration (the total of these components). The composition of each fraction analyzed after the steady state had been reached and the recovery of each component are shown in Table 1. The volumetric flow rate was about 26 l/hr at around the end of the feed step and about 32 l/hr at around the end of the desorption step. The time for completing one cycle was 71.4 minutes.

TABLE 1

| | Composition (wt %) | | | |
|---|---|---|---|---|
| | Feedstock (%) | Fraction DP1 (%) | Fraction DP2 (%) | Fraction DP3 + (%) |
| DP1 | 8.3 | 65.4 | 1.2 | 22.2 |
| DP2 | 85.0 | 6.8 | 97.4 | 35.0 |
| DP3 + | 6.7 | 27.8 | 1.4 | 42.8 |
| Concn. (%) | 60.0 | 4.5 | 33.3 | 6.2 |
| Recovery (%) | | 69.0 | 96.0 | 50.0 |

DP1: sorbitol
DP2: maltitol
DP3 +: sugar, alcohols of tri- or higher polysaccharides

TABLE 2

| Step | Supplied Fluid | Withdrawn Fluid | Valves Opened | Amount of Supplied Fluid (1) |
|---|---|---|---|---|
| 1 | feedstock | fraction DP2 | 11, 13, 16 | 5.3 |
| 2 | water | fraction DP2 | 12, 14, 16 | 3.7 |
| 3 | — | — | 10, 13 | 10.3 |
| 4 | water | fraction DP1 | 12, 13, 15 | 7.7 |
| 5 | water | fraction DP3 + | 12, 13, 17 | 4.5 |
| 6 | — | — | 10, 13 | 2.9 |

COMPARATIVE EXAMPLE 1

The same feedstock fluid as treated in Example 1 was subjected to chromatographic separation in the same manner as in Example 1, except that the pumping pressure was not fixed but the volumetric flow rate through the packed bed was fixed at 26 l/hr.

Figure 3:
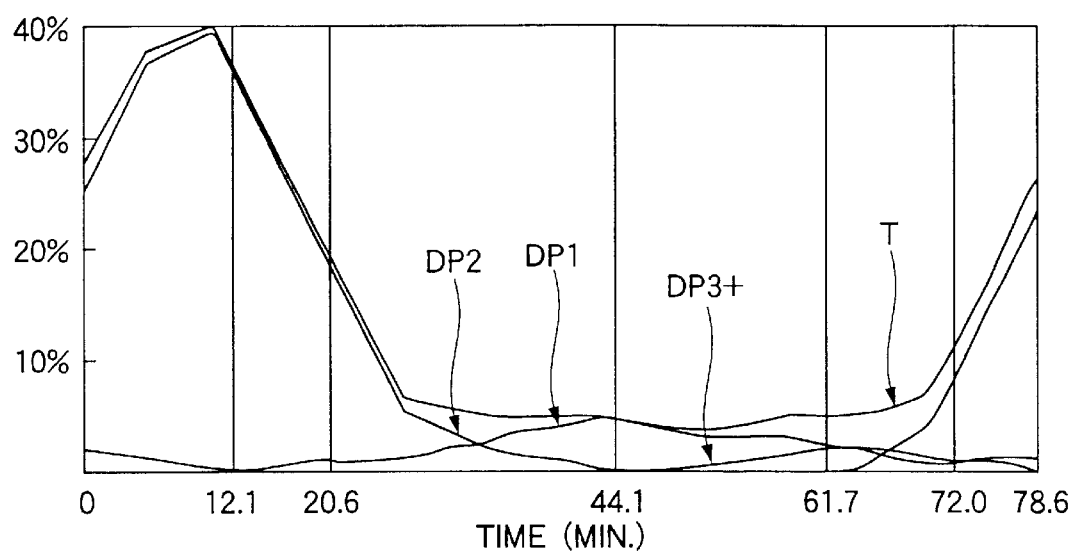
FIG. 3 shows concentration distributions of individual liquid components flown out from a packed bed in a comparative example.

On completion of 11 cycles, a steady state was reached, and the elution curves shown in FIG. 3 were obtained. The composition of each fraction and the recovery of each component are shown in Table 3 below. The pumping pressure was about 0.5 MPa at around the end of the feed step and about 0.3 MPa at about the end of the desorption step. The time required for one cycle was 78.6 minutes.

As can be seen from the results in Tables 1 and 3, although Comparative Example 1 was slightly advantageous in recovery of DP2 and provided fraction DP2 practically equal in quality to that of Example 1, the cycle time of Comparative Example 1 was longer by about 10%, revealing an about 10% reduction in productivity.

TABLE 3

| | Composition (wt %) | | |
|---|---|---|---|
| | Fraction DP1 (%) | Fraction DP2 (%) | Fraction DP3 + (%) |
| DP1 | 66.0 | 1.0 | 22.0 |
| DP2 | 6.0 | 97.9 | 34.0 |
| DP3 + | 28.0 | 1.1 | 44.0 |
| Concn. (%) | 4.8 | 33.8 | 6.0 |
| Recovery (%) | 69.5 | 96.9 | 49.6 |

The present invention provides the advantage of a shorter cycle time than in a conventional constant flow rate control system. This advantage leads to an improvement of throughput of a chromatographic separation apparatus per unit time with the desorbent being the same. With the treating rate of the feedstock fluid being the same, the requisite capacity of the column packed with an absorbent can be reduced, making it possible to reduce the construction cost of equipment. Further, the pump for delivering fluids can be operated at a fixed condition, ensuring stabilized operation.

The entire disclosure of each and every foreign patent application from which the benefit of foreign priority has been claimed in the present application is incorporated herein by reference, as if fully set forth.

What is claimed is:

1. A chromatographic process of a type wherein a feedstock fluid containing a plurality of components having different degrees of affinity for an adsorbent is supplied into a chromatographic separation system, in which the downstream end of a bed packed with the adsorbent is connected to its upstream end by a piping to enable the fluid to circulate, and made to flow through the packed bed from the upstream end of the packed bed to its downstream end thereby to form adsorption zones having the concentration distribution of the respective components and then separated into two or more fractions, the process comprising the steps of:

(i) supplying the feedstock fluid into the packed bed at its upstream end while withdrawing a fraction enriched in a first component from the downstream end of the bed, (ii) supplying a desorbent fluid into the packed bed at its upstream end while withdrawing a fraction enriched in a second component from the downstream end of the bed, and (iii) circulating the fluid through the bed from the downstream end to the upstream end of the packed bed through said piping without supplying or withdrawing any fluid to or from the packed bed, thereby making a mixed zone comprising the first component withdrawn in step (i) and the second component move to the upstream end of the packed bed, a cycle including steps (i), (ii) and (iii) in any order being repeated while controlling the discharged pressure of a pump delivering the feedstock fluid, the desorbent fluid, and the circulating fluid to be constant.

2. The chromatographic process according to claim 1, wherein said feedstock fluid is a mixture of at least two selected from the group consisting of sugars and sugar alcohols.

3. The chromatographic process according to claim 1, wherein said adsorbent is a cation exchange resin.

4. The chromatographic process according to claim 1, which is used for separating into two fractions.

5. The chromatographic process according to claim 1, which is used for separating into three fractions.

6. The chromatographic process according to claim 1, which is used for separating into four fractions.

7. A chromatographic process of a type wherein a feedstock fluid containing a plurality of components having different degrees of affinity for an adsorbent is supplied into a chromatographic separation system, in which the downstream end of a bed packed with the adsorbent is connected to its upstream end by a piping to enable the fluid to circulate, and made to flow through the packed bed from the upstream end of the packed bed to its downstream end thereby to form adsorption zones having the concentration distribution of the respective components and then separated into two or more fractions, the process comprising the steps of:

(i) supplying the feedstock fluid into the packed bed at its upstream end while withdrawing a fraction enriched in a first component from the downstream end of the bed, (ii) supplying a desorbent fluid into the packed bed at its upstream end while withdrawing a fraction enriched in a second component from the downstream end of the bed, and (iii) circulating the fluid through the bed from the downstream end to the upstream end of the packed bed through said piping without supplying or withdrawing any fluid to or from the packed bed, thereby making a mixed zone comprising the first component withdrawn in step (i) and the second component move to the upstream end of the packed bed, a cycle including steps (i), (ii) and (iii) in any order being repeated while controlling the discharged pressure of a pump delivering the feedstock fluid, the desorbent fluid, and the circulating fluid to be constant and making a switch from one step to another according to the cumulative amount of the liquid discharged from the pump.

8. The chromatographic process according to claim 7, wherein said feedstock fluid is a mixture of at least two selected from the group consisting of sugars and sugar alcohols.

9. The chromatographic process according to claim 7, wherein said adsorbent is a cation exchange resin.

10. The chromatographic process according to claim 7, which is used for separating into two fractions.

11. The chromatographic process according to claim 7, which is used for separating into three fractions.

12. The chromatographic process according to claim 7, which is used for separating into four fractions.

* * * * *